(No Model.)
J. R. REYNOLDS.
CLAMP FOR LOOPERS FOR SEWING MACHINES.
No. 378,462. Patented Feb. 28, 1888.
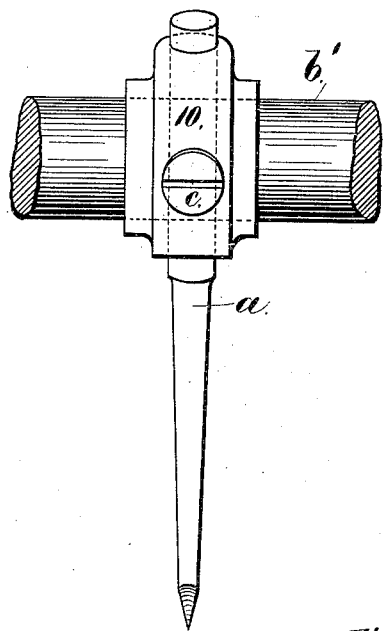
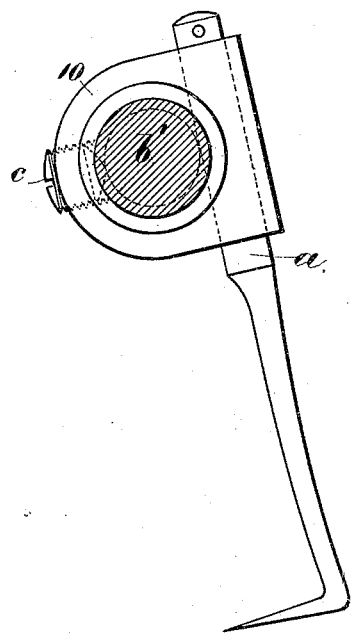
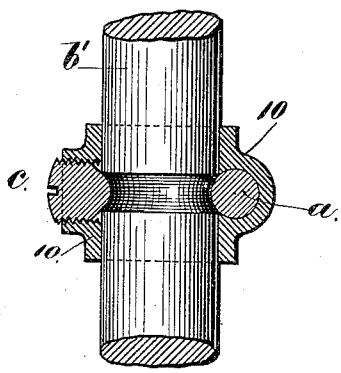
Witnesses
Harold Serrell.
Chas H. Smith
Inventor,
per John R. Reynolds.
Lemuel W. Serrell.
Atty.

UNITED STATES PATENT OFFICE.

JOHN R. REYNOLDS, OF HARTFORD, CONNECTICUT, ASSIGNOR TO THE SMYTH MANUFACTURING COMPANY, OF SAME PLACE.

CLAMP FOR LOOPERS FOR SEWING-MACHINES.

SPECIFICATION forming part of Letters Patent No. 378,462, dated February 28, 1888.

Application filed June 11, 1887. Serial No. 240,965. (No model.)

*To all whom it may concern:*

Be it known that I, JOHN R. REYNOLDS, of Hartford, in the county of Hartford and State of Connecticut, have invented an Improvement in Clamps for Loopers in Sewing-Machines and other Articles, of which the following is a specification.

In my application Serial No. 210,898, filed August 14, 1886, the present device is partially represented; but as the present improvement is available for holding tools and other instruments, as well as loopers for sewing-machines, no claim is therein made for the same.

My present invention is made with reference to holding a looper or other tool upon a shaft, and for allowing the looper to occupy any desired position as a tangent to said shaft, and for adjusting the looper or tool upon its own axis or stock, and for clamping the tool firmly by the action of one screw.

By this improvement, if there are several loopers or instruments upon one shaft, either one can be loosened or adjusted, and the looper and its clamping-collar can be partially revolved around the shaft for withdrawing the looper or tool for sharpening or otherwise, or for inserting a different looper or tool.

In the drawings, Figure 1 is an elevation of the shaft, clamping-collar, and looper. Fig. 2 is a cross-section of the shaft and elevation of the looper and clamping-collar, and Fig. 3 is a section.

The shaft $b'$ may be revolved or oscillated according to the character of the machine in which it is used, and around this shaft a segmental peripheral groove is turned. Where several loopers or tools are used on the same shaft a segmental peripheral groove will be provided for each looper or tool, and such grooves determine the distances apart between one tool and the next. To each tool there is a clamping-collar, 10, to fit over the shaft $b'$ sufficiently loose to be turned around upon the same freely, and there is a transverse hole through the collar of a size to receive the shank of the looper or other instrument $a$, and such transverse hole is at such a place that when the shank of the tool is inserted therein it will pass freely through, one side of the shank occupying the peripheral groove. At the opposite side of the collar is a set-screw, $c$, the end of which is preferably zone-shaped, so as to correspond to the section of the segmental peripheral groove.

When the screw is loosened, the clamp-collar can be turned around upon the shaft, or the shank of the looper or instrument moved endwise through its hole or partially rotated upon its axis, so as to adjust the looper or other instrument in any desired direction, and when the screw is tightened the parts will all be clamped firmly in position, and the revolution of the screw in tightening the same is not liable to misplace any of the parts, because its rounded end is within and conforms to the peripheral groove.

I claim as my invention—

The combination, with the shaft having a peripheral groove, of a clamping-collar around the shaft, a screw passing through the collar at one side, and a transverse hole passing across the clamping-collar at the other side, and a looper or other instrument having a cylindrical shank to pass into the hole and be clamped to the shaft by the action of the screw after being adjusted, substantially as specified.

Signed by me this 9th day of April, A. D. 1887.

JNO. R. REYNOLDS.

Witnesses:
W. B. McCRAY,
CHAS. E. PARKER.